United States Patent
Thomas et al.

(10) Patent No.: US 11,250,872 B2
(45) Date of Patent: Feb. 15, 2022

(54) USING CLOSED CAPTIONS AS PARALLEL TRAINING DATA FOR CUSTOMIZATION OF CLOSED CAPTIONING SYSTEMS

(71) Applicant: International Business Machines Corporation, Armonk, NY (US)

(72) Inventors: Samuel Thomas, White Plains, NY (US); Yinghui Huang, New York, NY (US); Masayuki Suzuki, Tokyo (JP); Zoltan Tueske, White Plains, NY (US); Laurence P. Sansone, Beacon, NY (US); Michael A. Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/714,719

(22) Filed: Dec. 14, 2019

(65) Prior Publication Data
US 2021/0183404 A1    Jun. 17, 2021

(51) Int. Cl.
*G10L 15/26*    (2006.01)
*G10L 21/10*    (2013.01)
(Continued)

(52) U.S. Cl.
CPC .............. *G10L 21/10* (2013.01); *G10L 15/08* (2013.01); *G10L 15/22* (2013.01); *G10L 2015/088* (2013.01)

(58) Field of Classification Search
CPC .......... G10L 15/22; G10L 15/26; G06F 40/35
See application file for complete search history.

(56) References Cited

U.S. PATENT DOCUMENTS 6,710,812 B2    3/2004    Taylor, Jr. et al.
6,757,866 B1    6/2004    Dey et al.
(Continued)

FOREIGN PATENT DOCUMENTS

CA    2572709 C    3/2014
CN    104025077 A    9/2014
(Continued)

OTHER PUBLICATIONS

ISR/WO (International Search Report/Written Opinion) in International Application No. PCT/IB2020/061721 dated Mar. 23, 2021.
(Continued)

*Primary Examiner* — Daniel Abebe
(74) *Attorney, Agent, or Firm* — Matthew J. Bussan

(57) ABSTRACT

Method, apparatus, and computer program product are provided for customizing an automatic closed captioning system. In some embodiments, at a data use (DU) location, an automatic closed captioning system that includes a base model is provided, search criteria are defined to request from one or more data collection (DC) locations, a search request based on the search criteria is sent to the one or more DC locations, relevant closed caption data from the one or more DC locations are received responsive to the search request, the received relevant closed caption data are processed by computing a confidence score for each of a plurality of data sub-sets of the received relevant closed caption data and selecting one or more of the data sub-sets based on the confidence scores, and the automatic closed captioning system is customized by using the selected one or more data sub-sets to train the base model.

20 Claims, 7 Drawing Sheets

(51) Int. Cl.
*G10L 15/22* (2006.01)
*G10L 15/08* (2006.01)

(56) References Cited

U.S. PATENT DOCUMENTS

| | | |
|---|---|---|
| 7,801,910 B2 | 9/2010 | Houh et al. |
| 8,559,793 B2 | 10/2013 | Wallace |
| 8,688,679 B2 | 4/2014 | Lalji et al. |
| 8,755,174 B2 | 6/2014 | Ogle et al. |
| 8,775,174 B2 | 7/2014 | Conejero et al. |
| 9,100,723 B2 | 8/2015 | Nguyen et al. |
| 9,544,528 B2 | 1/2017 | Gharachorloo et al. |
| 2005/0119885 A1* | 6/2005 | Axelrod ............... G10L 15/063 704/231 |
| 2007/0027844 A1 | 2/2007 | Toub et al. |
| 2008/0065693 A1 | 3/2008 | Malik |
| 2009/0276402 A1 | 11/2009 | Stiers |
| 2009/0281786 A1* | 11/2009 | Ando ................... G06F 40/00 704/2 |
| 2010/0121973 A1 | 5/2010 | Lobacheva et al. |
| 2013/0346144 A1 | 12/2013 | Ferren et al. |
| 2014/0358539 A1* | 12/2014 | Rao ..................... G10L 15/183 704/243 |
| 2015/0113013 A1 | 4/2015 | Rys et al. |
| 2016/0007054 A1 | 1/2016 | Polumbus et al. |
| 2016/0156972 A1 | 6/2016 | Oztaskent et al. |
| 2016/0261917 A1 | 9/2016 | Trollope et al. |
| 2019/0244606 A1 | 8/2019 | Baughman et al. |
| 2020/0175987 A1* | 6/2020 | Thomson ............. G10L 15/187 |

FOREIGN PATENT DOCUMENTS

| | | |
|---|---|---|
| CN | 107004210 A | 8/2017 |
| WO | 9612239 A1 | 4/1996 |
| WO | 2013100978 A1 | 7/2013 |
| WO | 2021116952 A1 | 6/2021 |

OTHER PUBLICATIONS

Mell et al., "The NIST Definition of Cloud Computing", National Institute of Standards and Technology, NIST Special Publication 800-145, Sep. 2011, 7 pages.

* cited by examiner

USING CLOSED CAPTIONS AS PARALLEL TRAINING DATA FOR CUSTOMIZATION OF CLOSED CAPTIONING SYSTEMS

BACKGROUND

The present invention relates in general to the field of closed captioning. More particularly, the present invention relates to customizing automatic closed captioning systems.

SUMMARY

Embodiments of the present disclosure include a method, apparatus, and computer program product for customizing an automatic closed captioning system. In some embodiments, at a data use (DU) location, an automatic closed captioning system that includes a base model (e.g., an acoustic model, a language model, and a vocabulary, etc.) is provided, search criteria are defined to request from one or more data collection (DC) locations, a search request based on the search criteria is sent to each of the one or more DC locations, relevant closed caption data from each of the one or more DC locations are received responsive to the search request, the received relevant closed caption data are processed by computing a confidence score for each of a plurality of data sub-sets of the received relevant closed caption data and selecting one or more of the data sub-sets based on the confidence scores, and the automatic closed captioning system is customized by using the selected one or more data sub-sets to train the base model. In some embodiments, at each of the one or more DC locations, closed caption data are collected and curated, the relevant closed caption data are selected based on the search request, and the relevant closed caption data are sent to the DU location.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
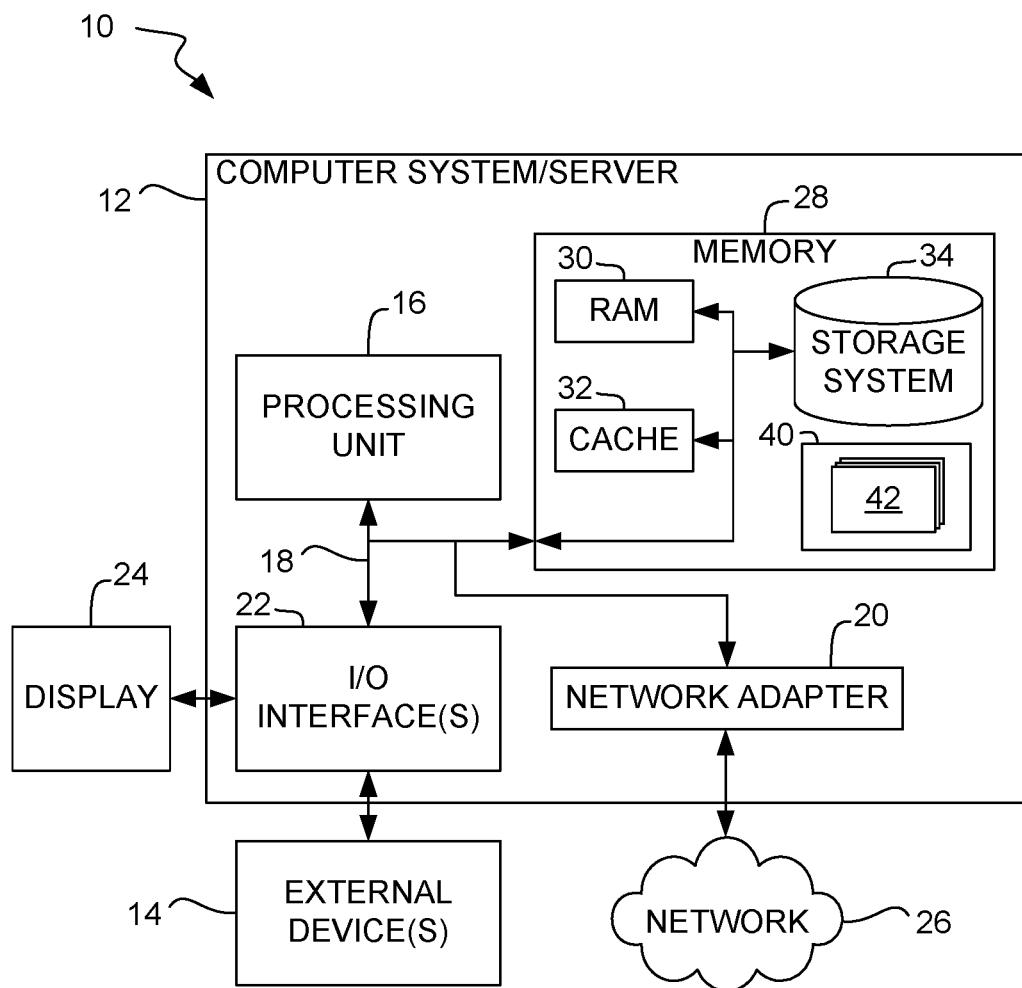
FIG. 1 depicts a cloud computing node, according to one or more embodiments.

Customization of automatic speech recognition (ASR) based captioning systems, e.g., to broadcast stations where customization technology is being newly deployed, is very useful in achieving improved accuracy in applications such as broadcast news captioning. However, collecting data for customization can be expensive. For example, if prior captioning services do not exist at a local broadcast station where the conventional customization technology is being newly deployed, collecting data for customization can be expensive because broadcast news data available lately at that broadcast station (i.e., broadcast news data collected from news programming that was recently broadcast) typically needs to be manually transcribed.

Also, given that news content is continuously changing (e.g., new people names, new event names, etc. appear very frequently), broadcast news captioning systems need to be continuously updated with new content and terms. Setting up data collection at every broadcast station location and processing the collected data can be expensive.

A popular approach often used to improve ASR performance in these settings, is data augmentation. Data augmentation increases the diversity of training data by artificially creating additional training samples using various signal and data processing techniques.

In accordance with some embodiments, improved automatic closed captioning performance may be achieved, not by modifying local data collected at the particular location as in data augmentation, but by leveraging data collected in parallel at other locations.

This approach leverages the observation that the content of several broadcast news segments telecast from various locations (e.g., national news stories, international news stories, etc.) is often the same, or at least substantially similar. Closed captions of these common news stories, if selected appropriately, can hence be shared, in accordance with some embodiments, to improve ASR models of any other local broadcast news station. This approach is applicable to both the above scenarios (new deployment and updates), allowing captioning systems to be seamlessly deployed in new stations and allowing for existing captioning systems to be continuously updated.

Embodiments of the present disclosure include a method, apparatus, and computer program product for customizing an automatic closed captioning system. In some embodiments, at a data use (DU) location, an automatic closed captioning system that includes a base model (e.g., an acoustic model, a language model, and a vocabulary, etc.) is provided, search criteria are defined to request from one or more data collection (DC) locations, a search request based on the search criteria is sent to each of the one or more DC locations, relevant closed caption data from each of the one or more DC locations are received responsive to the search request, the received relevant closed caption data are processed by computing a confidence score for each of a plurality of data sub-sets of the received relevant closed caption data and selecting one or more of the data sub-sets based on the confidence scores, and the automatic closed captioning system is customized by using the selected one or more data sub-sets to train the base model. In some embodiments, at each of the one or more DC locations, closed caption data are collected and curated, the relevant closed caption data are selected based on the search request, and the relevant closed caption data are sent to the DU location.

Given a broadcast news test set for captioning at the DU location, a customization process that uses parallel data from one or more DC locations, in accordance with some embodiments, may be formulated into the following operations—(A) Decode the test set using an available captioning system (e.g., the base model before customization). These decode texts may serve as seed data to help select matched data from the one or more DC locations with closed captions, (B) build a language model from seed data for scoring or convert all texts to proper vector representations, (C) score each sentence in the available parallel closed caption training set against seed data and rank them, and (D) select sentences according to the ranking and customize the base language model. For example, the decoded test data may be used to select relevant data using selection techniques, such as perplexity scores, TF-IDF vector similarities, and/or sentence embedding similarities. These three selection techniques are described below. In some embodiments, for each of these three selection techniques, the top N sentences (e.g., 60K) from parallel corpora (i.e., the one or more DC locations) that best match the seed data may be selected.

Perplexity scores—A language model is first built using seed data and then used to compute perplexity scores for each sentence in the parallel corpora. Sentences are sorted on the assigned scores and the top N sentences above a threshold are then selected as a relevant set for customization.

Term Frequency-Inverse Document Frequency vector similarity—TF-IDF scores are popularly used in information retrieval, text mining applications as a tool to reflect relevance between documents. In accordance with some embodiments, TF-IDF vectors are generated for each available sentence in the parallel corpora and then ranked using cosine similarity sores to find sentences that are close to the seed data. The top N matching sentences are then used for customization. Prior to generating the TF-IDF vectors, standard text processing steps may be performed (e.g., filtering out stop words, normalized for sentence length, smoothing IDF scores).

Sentence embedding similarity—Pre-trained sentence embeddings may also be used for selecting relevant sentences form parallel corpora. BERT (Bidirectional Encoder Representations from Transformers) embeddings that have recently been used in a wide range of natural language understanding (NLU) tasks are representations that encode rich syntactic and semantic information. In accordance with some embodiments, fixed length embeddings are derived using pre-trained models $BERT_{base}$. Similar to TF-IDF, cosine similarity is used for ranking and selecting a relevant set for customization.

In some embodiments, the DU location is also a DC location for another DU location.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
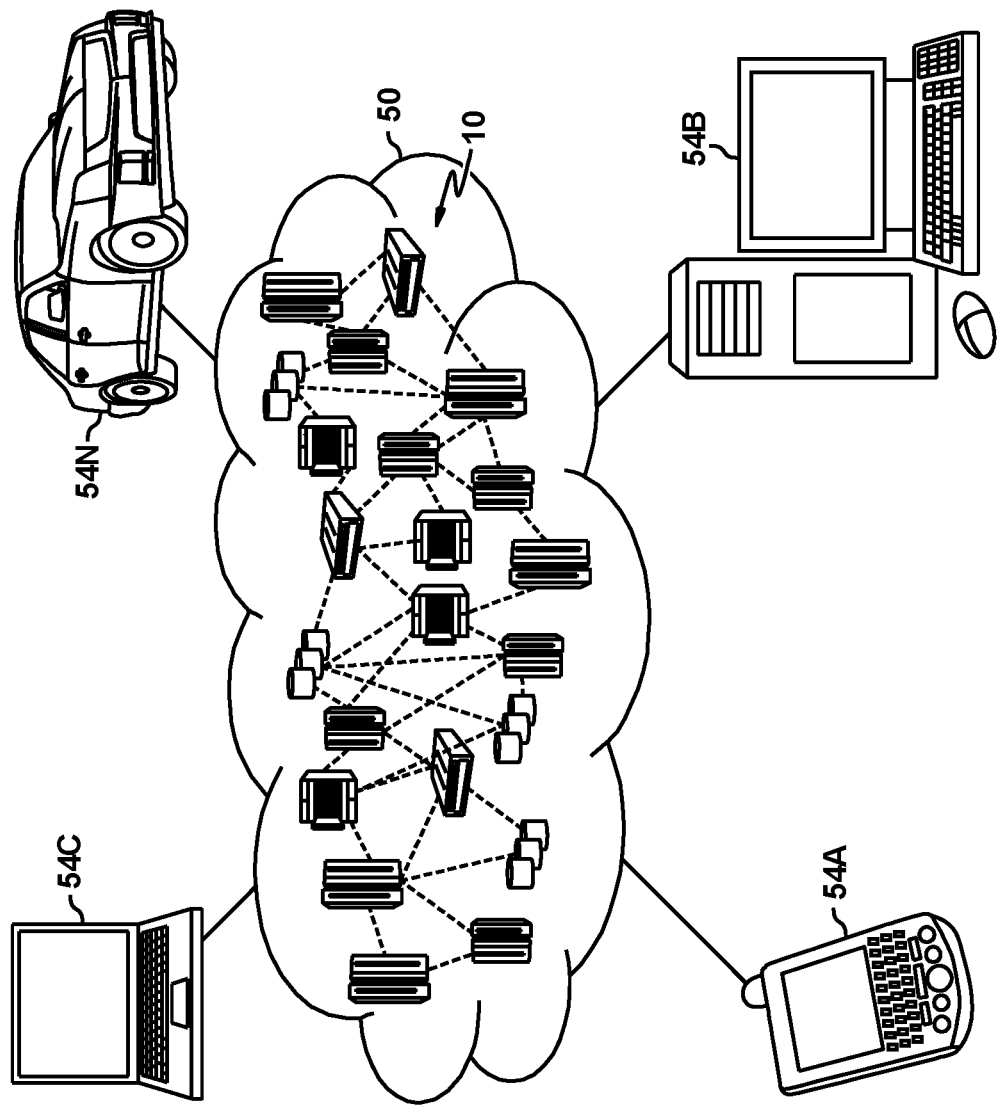
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
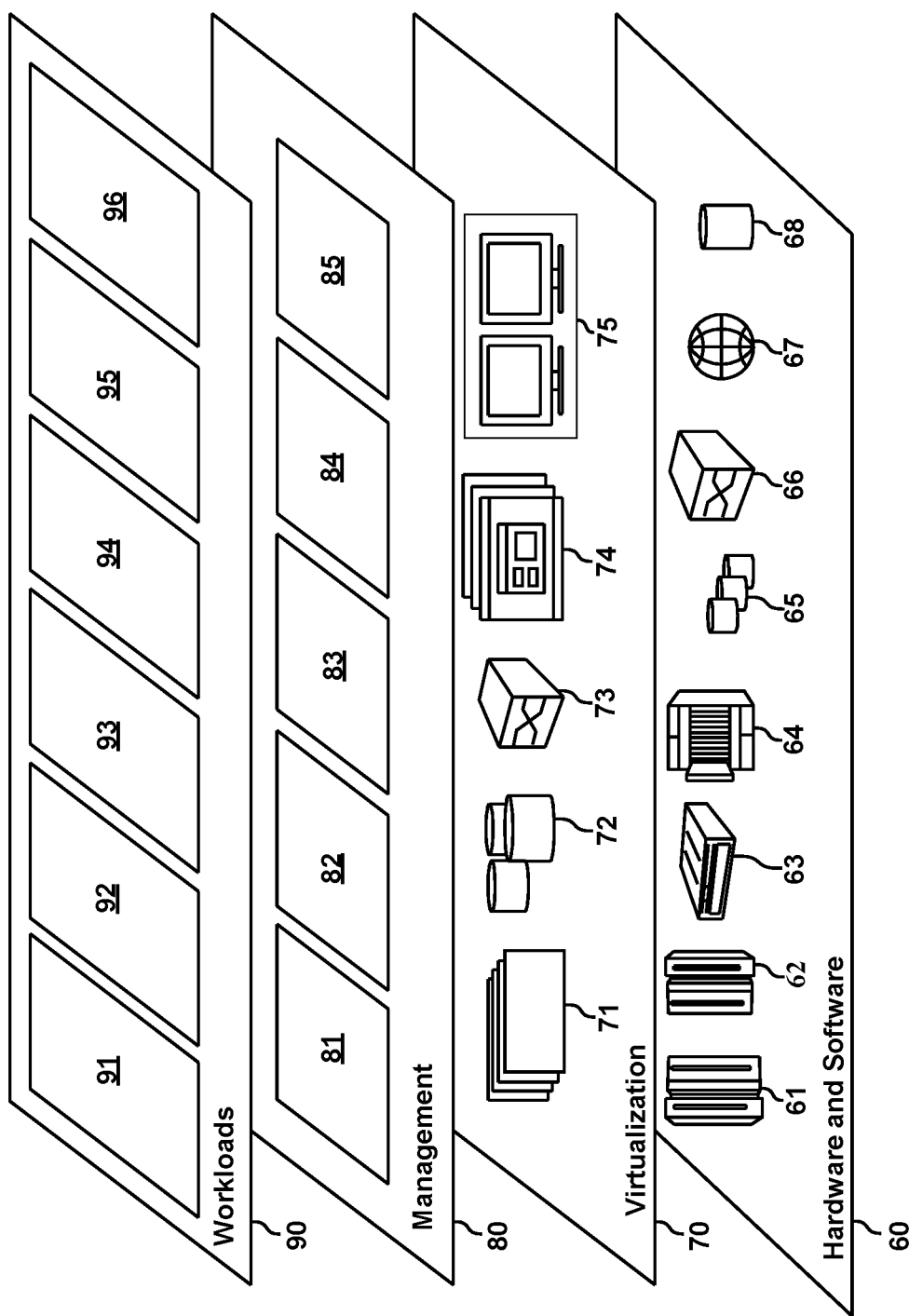
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and closed caption system customization 96.

Figure 4:
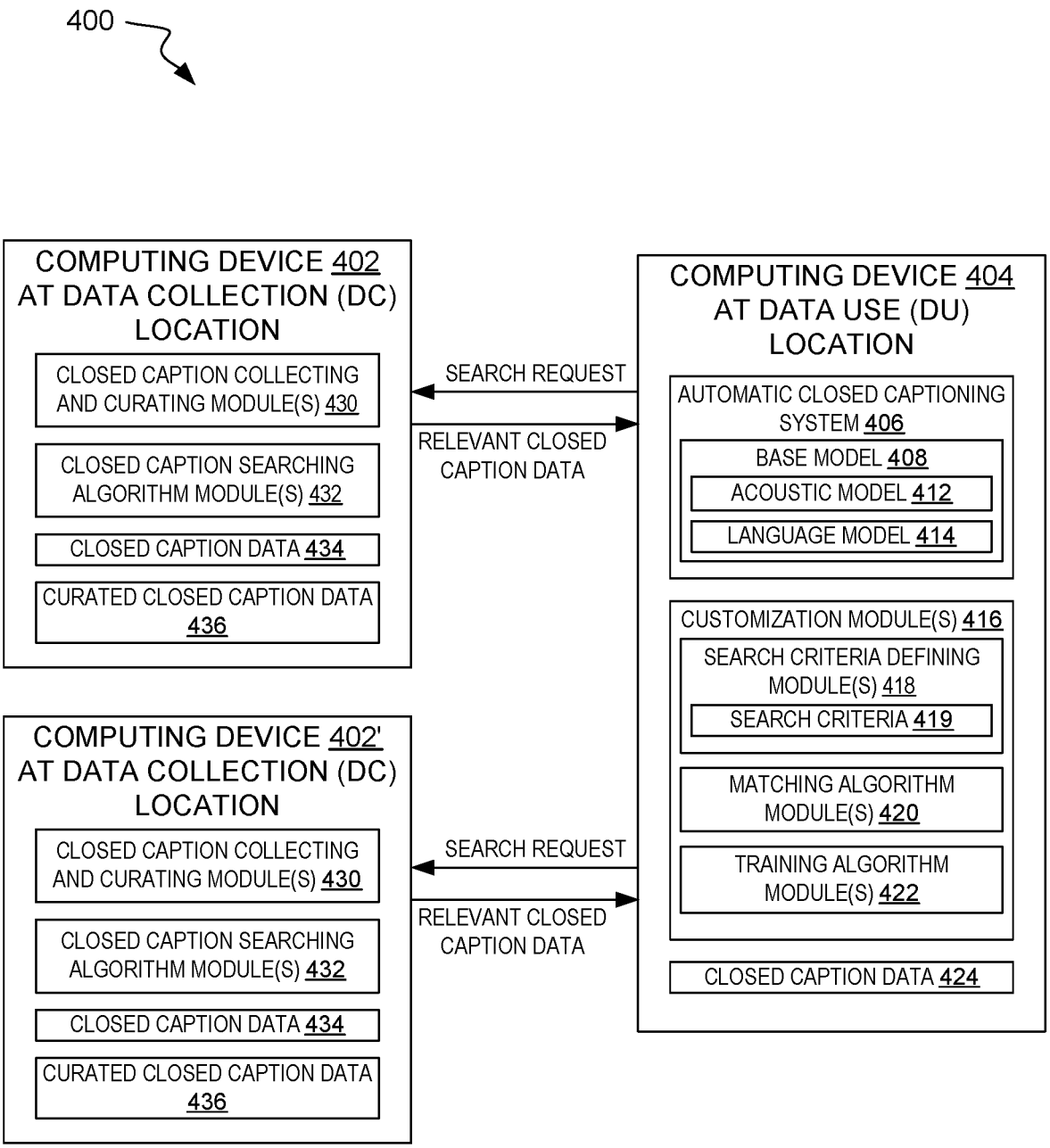
FIG. 4 depicts an exemplary system for customizing an automatic closed captioning system, according to one or more embodiments.

Referring now to FIG. 4, depicted is an exemplary system 400 for customizing an automatic closed captioning system 406 of a computing device 404 at a data use (DU) location using parallel training data from a computing device (e.g., computing device 402, 402') at each of one or more data collection (DC) locations in accordance with one or more embodiments. In some embodiments, the system 400 is utilized to customize the automatic closed captioning system 406 when the system 406 is initially deployed on the computing device 404 at the (DU) location. In other embodiments, the system 400 is utilized to update the customization of the automatic closed captioning system 406 on an ongoing basis.

The automatic closed captioning system 406 includes a base model 408 comprised of various base components, such as an acoustic model 412, a language model 414, a vocabulary (not shown), etc. The base model 408 and its components are non-customized or "base" in that they have not been trained for use at the DU location. The automatic closed captioning system 406, the base model 408 and its components may be conventional.

In some embodiments, the base model 408 may include a hybrid acoustic model (AM) as the acoustic model 412. A base hybrid AM is also referred to herein as a "base convolutional neural network (CNN) based acoustic model (AM)," or "base CNN based AM." To leverage the large amount of available broadcast news (BN) data, instead of directly using a convolutional acoustic model and a non-convolutional acoustic model (which tend to be powerful, but complicated), these models can be used as teacher networks to train a compact and simple CNN based student network that can be more easily deployed. The student-teacher training framework is a very useful framework for training simple acoustic models to mimic powerful and complicated teacher networks. A residual network (ResNet) may be used as the convolutional (teacher) network. A LSTM may be used as the non-convolutional (teacher) network. Long short-term memory (LSTM) is an artificial recurrent neural network (RNN) architecture. Once the teacher networks are trained, confidence scores from the teacher networks may be combined and used to train a student speaker-independent CNN model using the student-teacher training framework.

In some embodiments, the base model 408 may include an end-to-end attention based acoustic model (AM) as the acoustic model 412. A base end-to-end attention based AM is also referred to herein as a "base attention-based encoder-decoder model."

In some embodiments, the base model 408 may include an n-gram based language model (LM) as the language model 414. A base n-gram based LM is also referred to herein as a base n-gram LM. In some embodiments, the base model 408 may include a base hybrid AM as the acoustic model 412 and a base n-gram LM as the language model 414.

In some embodiments, the base model 408 may include a neural network based language model (LM) as the language model 414. A base neural network based LM is also referred to herein as a base NNLM. In some embodiments, the base model 408 may include a base attention-based encoder-decoder model as the acoustic model 412 and a base NNLM as the language model 414.

In addition to the automatic closed captioning system 406, the computing device 404 at the DU location also includes one or more customization modules 416, including one or more search criteria defining modules 418, one or more matching algorithm modules 420, and one or more training algorithm modules 422.

The one or more search criteria defining modules 418, in accordance with some embodiments, define search criteria to request from a computing device (e.g., computing device 402, 402') at each of one or more data collection (DC) locations. For example, if searchable locators are available, the search criteria defined by the one or more criteria defining modules 418 may employ date/keywords etc. to create search based on those locators. On the other hand, if only audio data is available (i.e., need data that matches that audio), the one or more criteria defining modules 418 may decode the audio and use the audio output for direct text search, or additionally create embeddings for the decoded data and use the embeddings as search criteria. For example, the one or more criteria defining modules 418 may decode the audio data, create sentence embeddings for the decoded data, and use the sentence embeddings as search criteria.

In some embodiments, a search request based on the search criteria is sent directly from the computing device 404 at the DU location to the computing device (e.g., computing device 402, 402') at each of the one or more DC locations. In other embodiments, the search criteria may be sent from the computing device 404 at the DU location to a server device (e.g., 720 in FIG. 7), which in turn sends a search request based on the search criteria to the computing device (e.g., computing device 402, 402') at each of the one or more DC locations.

The one or more matching algorithm modules 420, in accordance with some embodiments, processes the relevant closed caption data received from the computing device (e.g., computing device 402, 402') at the one or more DC locations to select matched data. For example, the one or more matching algorithm modules 420 may compute a confidence score for each of a plurality of data sub-sets of the received relevant closed caption data and select one or more of the data sub-sets based on the confidence scores. In some embodiments, the data sub-sets may be selected based on confidence thresholds. In some embodiments, the data sub-sets may be ranked and then selected according to ranking.

The one or more training algorithm modules 422, in accordance with some embodiments, uses the selected one or more data sub-sets to train the base model 406. The one or more training algorithms modules 422 may be conventional.

In addition, the computing device 404 at the DU location may also include closed caption data 424 produced by the automatic closed captioning system 406 (before the base model 406 of the automatic closed captioning system 406 is customized) to serve as seed data to help select matched data from other sites with closed captions. For example, the seed data may be used as input to the one or more matching algorithm modules 420 to facilitate data selection among the relevant data received from the computing device (e.g., computing devices 402, 402') at each of one or more data collection (DC) locations.

The computing device (e.g., computing device 422, 422') at each of the DC locations, in accordance with some embodiments, incudes one or more closed caption collecting and curating modules 430 and one or more closed caption searching algorithm modules 432, along with closed caption data 434 and curated closed caption data 446 that are collected/curated by the one or more closed caption collecting and curating modules 430.

The one or more closed caption collecting and curating modules 430, in accordance with some embodiments, collects the closed caption data 434 and performs one or more data curation operations to generate the curated closed caption data 436. Data curation operations that may be performed by the one or more closed caption collecting and curating modules 430 include, but are not limited to, collecting audio data with closed captions, adding meta-data tags or labels to the closed captions (e.g., ad data (AD), broadcast news (BN), date, keywords, speaker labels, time markings, etc.), converting closed captions into embeddings for search based on content. In some embodiments, search may be performed on the curation closed caption data 436. In other embodiments, search may be performed on raw captions 434.

The one or more closed caption searching algorithm modules 432, in accordance with some embodiments, when a search request is received (either directly from the computing device 404 or from a server device (e.g., 720 in FIG. 7)), searches for relevant data under at least one of the following categories: search based on meta-data tags or labels; search based on embeddings; and search based on actual text.

Figure 5:
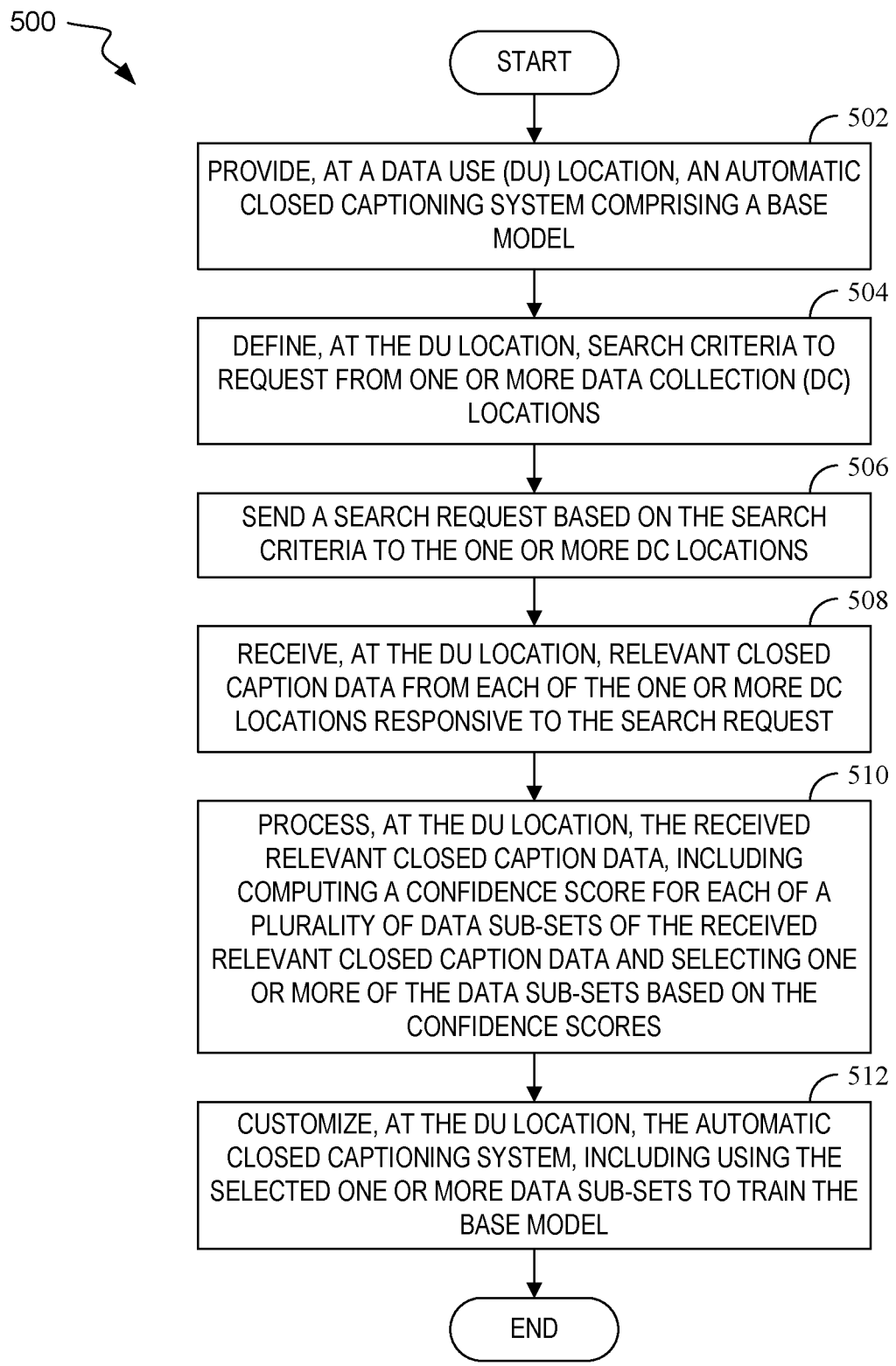
FIG. 5 is a flow diagram of operations performed at a data use (DU) location in an illustrative method of customizing an automatic closed captioning system, according to one or more embodiments.

Referring now to FIG. 5, a flow diagram is depicted of an illustrative method 500 performed at a data use (DU) location for customizing an automatic closed captioning system in accordance with one or more embodiments. The method 500 sets forth the preferred order of the blocks. It must be understood, however, that the various blocks may occur at any time relative to one another.

The method 500 begins by providing, at the DU location, an automatic closed captioning system comprising a base model (block 502).

The method 500 continues by defining, at the DU location, search criteria to request from one or more data collection (DC) locations (block 504).

In some embodiments, defining search criteria includes defining search criteria to facilitate search for relevant closed caption data with respect to one or more desired targets.

In some embodiments, defining search criteria includes defining search criteria to facilitate search for relevant closed caption data with respect to a desired data set. For example, an audio recording corresponding to the desired data set may be decoded using the base model to produce decoded data to serve as seed data, the decoded data may be converted to embeddings, the embeddings may be used as the search criteria, and the embeddings received as the relevant closed caption data from each of the one or more DC locations may be scored based on similarity scores according to the search criteria. Alternatively, the decoded data may be used as the search criteria for direct text search.

Next, the method 500 continues by sending a search request based in the search criteria to each of the one or more DC locations (block 506).

The method 500 continues by receiving, at the DU location, relevant closed caption data from each of the one or more DC locations responsive to the search request (block 508).

Next, the method 500 continues by processing, at the DU location, the received relevant closed caption data, including computing a confidence score for each of a plurality of data sub-sets of the received relevant closed caption data and selecting one or more of the data sub-sets based on the confidence scores (block 510).

In some embodiments, the decoded data (i.e., produced in block 504 to serve as seed data) may be used to build a language model, which may be used to score embeddings received as the relevant closed caption data from each of the one or more DC locations.

The method 500 continues by customizing, at the DU location, the automatic closed captioning system, including using the selected one or more data sub-sets to train the base model (block 512). The base model may be trained using conventional techniques. The method 500 may then end.

In some embodiments, customizing the automatic closed captioning system includes customizing a language model, an acoustic model, and/or a vocabulary of a base automatic speech recognition (ASR) system underling the automatic closed captioning system.

In some embodiments, customizing the automatic closed captioning system includes customizing an ad detector system to filter out ads, a speaker diarization system, a speaker change detection system, and/or a speech activity detection system.

In some embodiments, customizing the automatic closed captioning system includes customizing one or more base systems at the DU location using the relevant closed caption data received at the DU location form each of the one or more DC locations that matches the decoded data (i.e., produced in block 504 to serve as seed data).

Figure 6:
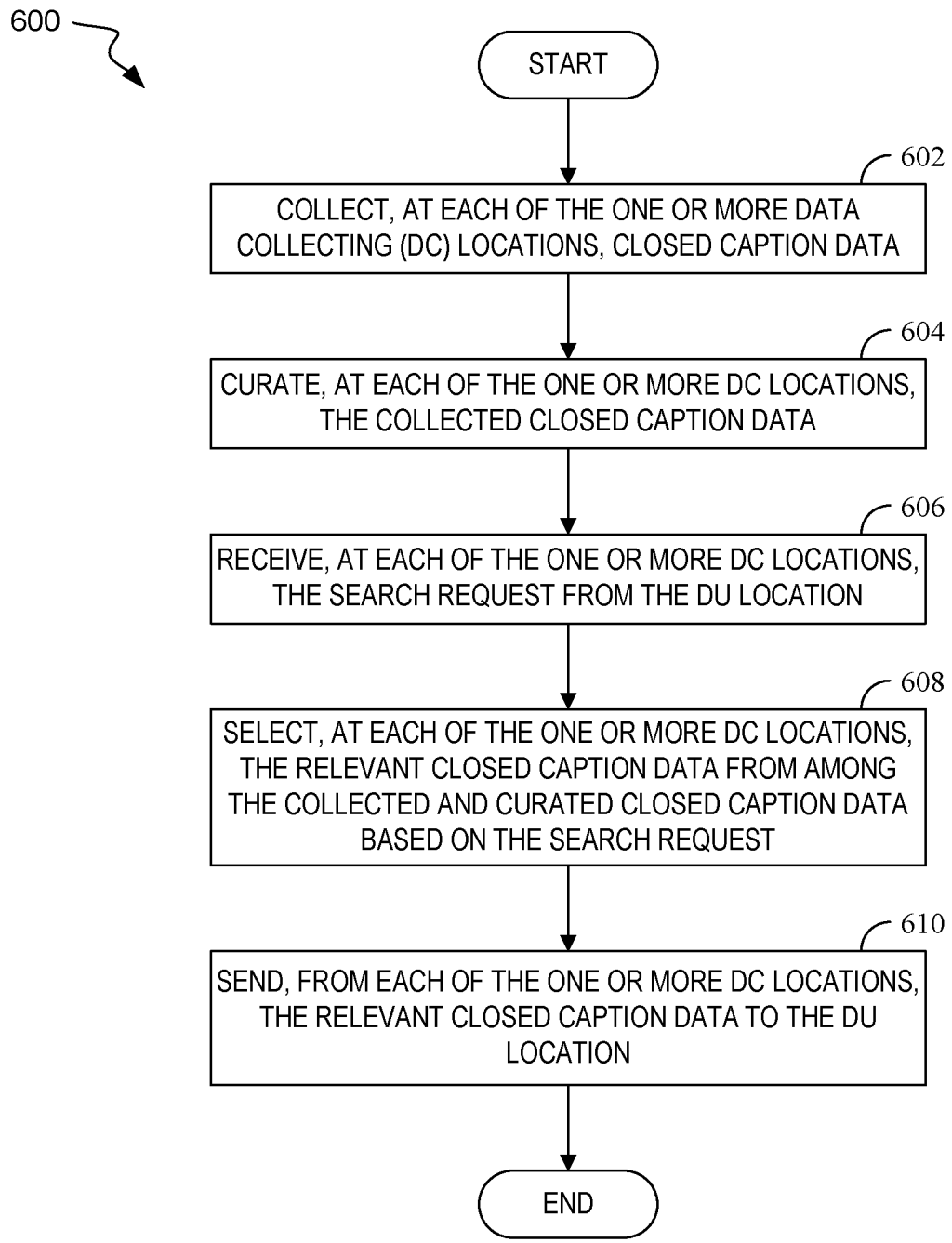
FIG. 6 is a flow diagram of operations performed at one or more data collection (DC) locations in an illustrative method of customizing an automatic closed captioning system, according to one or more embodiments.

Referring now to FIG. 6, a flow diagram is depicted of an illustrative method 600 performed at one or more data collection (DC) locations for customizing an automatic closed captioning system in accordance with one or more embodiments. The method 600 sets forth the preferred order of the blocks. It must be understood, however, that the various blocks may occur at any time relative to one another.

The method 600 begins by collecting, at each of the one or more DC locations, closed caption data (block 602).

The method 600 continues by curating, at each of the one or more DC locations, the collected closed caption data (block 604).

In some embodiments, curating includes tagging the collected closed caption data with a searchable locator identifying at least a portion of the collected closed caption data as either a news closed caption or as a closed caption for an advertisement.

In some embodiments, curating includes tagging the collected closed caption data with a searchable locator identifying at least a portion of the collected closed caption data according to chronological order. For example, the searchable locator may include a day, month, and year of broadcast.

In some embodiments, curating includes tagging the collected closed caption data with a searchable locator identifying at least a portion of the collected closed caption data according to content. For example, the searchable locator may include international news, national news, local news, sports, weather, and talk show.

In some embodiments, curating includes tagging the collected closed caption data with a searchable locator identifying at least a portion of the collected closed caption data according to metadata and/or keywords.

In some embodiments, curating includes converting the collected closed caption data to embeddings. For example, the embeddings may include Term Frequency-Inverse Document Frequency (TF-IDF) embeddings, word embeddings, and sentence embeddings.

In some embodiments, curating includes pairing the collected closed caption data with corresponding audio recordings.

Next, the method 600 continues by receiving, at each of the one or more DC locations, the search request from the DU location (block 606).

The method 600 continues by selecting, at each of the one or more DC locations, the relevant closed caption data from among the collected and curated closed caption data based on the search request (block 608).

Next, the method 600 continues by sending, from each of the one or more DC locations, the relevant closed caption data to the DU location (block 610). The method 600 may then end.

Figure 7:
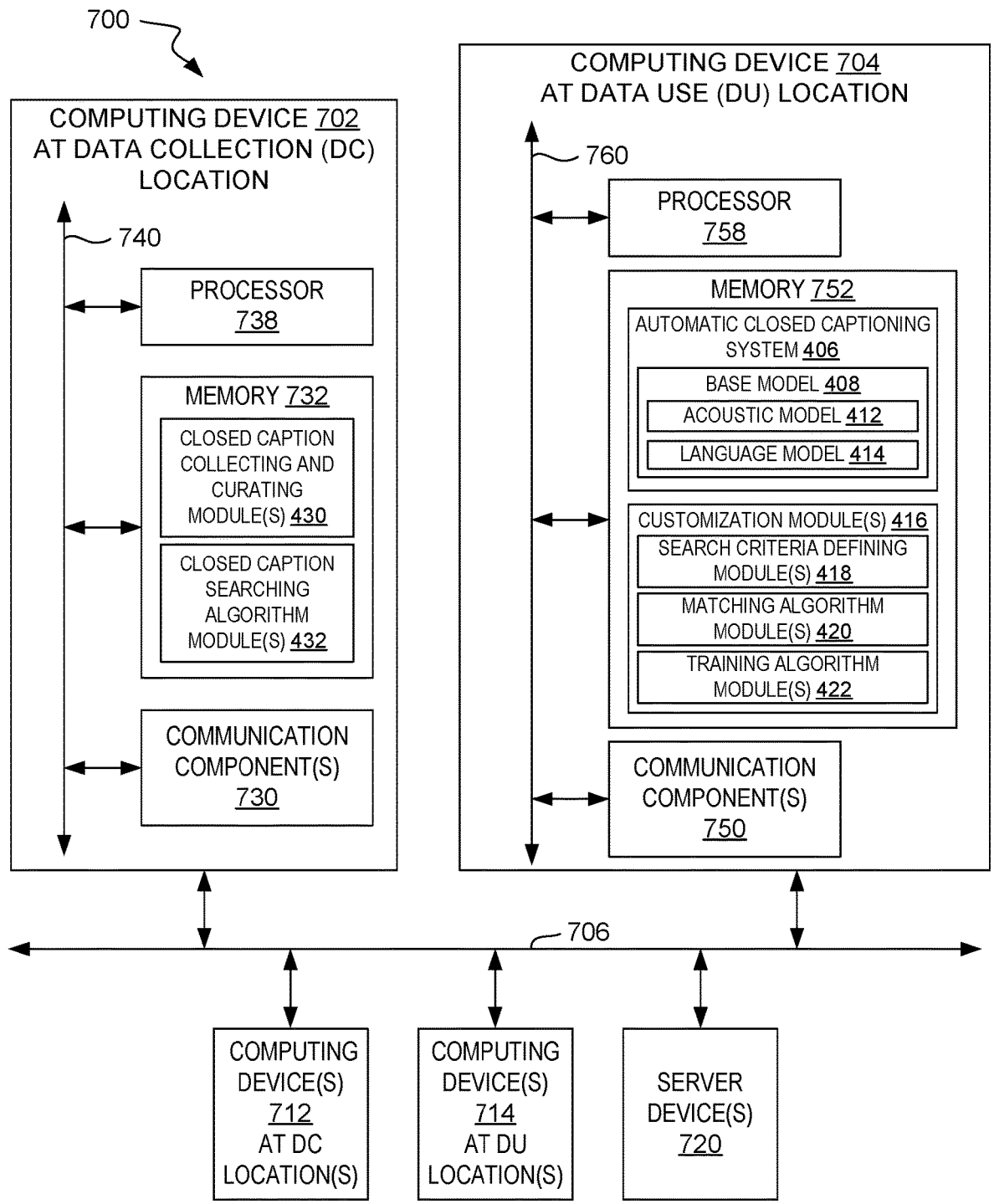
FIG. 7 illustrates a block diagram of an example, non-limiting system that facilitates customization of an automatic captioning system, according to one or more embodiments.

Referring now to FIG. 7, a block diagram of an example, non-limiting system 700 that facilitates customization of an automatic captioning system in accordance with one or more embodiments. Repetitive description of like elements employed in other embodiments described herein is omitted for the sake of brevity. Aspects of systems (e.g., system 700 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 7, the system 700 may include one or more computing devices 702, 712 at one or more data collection (DC) locations, one or more computing devices 704, 714 at one or more data use (DU) locations, and one or more server devices 720. It is to be appreciated that the one or more computing devices 702, 712 at the one or more DC locations, the one or more computing devices 704, 714 at the one or more DU locations, and the one or more server devices 720 may be equipped with communication devices (e.g., one or more communication components 730, described below, with respect to the computing device 702 at a DC location) that enable communication between the one or more computing devices 702, 712 at the one or more DC locations, the one or more computing devices 704, 714 at the one or more DU locations, and the one or more server devices 720 over the one or more networks 706.

The one or more computing devices 702, 712 at the one or more DC locations may include the structure and/or functionality described herein with respect to the one or more computing devices 402, 402' at the one or more DC locations in FIG. 4 and the method 600 in FIG. 6. Computing device 712 may be a different type of computing device than computing device 702. Computing device 712 may also be a computing device 702 and/or include one or more components of computing device 702. It is to be appreciated that in discussions below where more than one computing device at DC locations is employed, the computing devices may include one or more computing devices 702 and/or one or more computing devices 712.

The one or more computing devices 704, 714 at one or more DU locations may include the structure and/or functionality described herein with respect to the one or more computing devices 404 at one or more DU locations in FIG. 4 and the method 500 in FIG. 5. Computing device 714 may be a different type of computing device than computing device 704. Computing device 714 may also be a computing device 704 and/or include one or more components of computing device 704. It is to be appreciated that in discussions below where more than one computing device at DU locations is employed, the computing devices may include one or more computing devices 704 and/or one or more computing devices 714.

The various components (e.g., computing devices 702, 712, computing devices 704, 714, server devices 720, communication components 730, 750, memory 732, 752, processor 738, 758, and/or other components) of system 700 may be connected directly or via one or more networks 706. Such networks 706 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, quantum communication, and/or any other suitable communication technology.

Computing device 702 at the DC location may include one or more communication components 730 that enable computing device 702 to communicate with one or more computer device 704, 714 at one or more DU locations, one or more other computing devices 712 at one or more other DC locations, and one or more server devices 720 over one or more networks 706 via wireless and/or wired communications. For example, the one or more communication components 730 may correspond to network adapter 20 in FIG. 1.

Computing device 702 at the DC location may include or otherwise be associated with at least one memory 732 that may store computer executable program module(s) (e.g., computer executable program module(s) may include, but are not limited to, closed caption collecting and curating module(s) 430, closed caption searching algorithm module(s) 432, and associated program module(s)). Closed caption collecting and curating module(s) 430 and closed caption searching algorithm module(s) 432 may correspond to program modules 42 in FIG. 1. Computing device 702 at a DC location may also include or otherwise be associated with at least one processor 738 that executes the computer executable program module(s) stored in the memory 732. Computing device 702 at a DC location may further include a system bus 740 that may couple the various components including, but not limited to, communication component(s) 730, memory 732, processor 738, and/or other components.

While the computing device 702 at the DC location is shown in FIG. 7 as including the closed caption collecting and curating module(s) 430 and the closed caption searching algorithm module(s) 432, in other embodiments, any number of different types of devices may be associated with or include all or some of the closed caption collecting and curating module(s) 430 and/or the closed caption searching algorithm module(s) 432. For example, one or more server devices 720 may include all or some of the closed caption collecting and curating module(s) 430 and/or the closed caption searching algorithm module(s) 432. In other words, data processing associated with the closed caption collecting and curating module(s) 430 and the closed caption searching algorithm module(s) 432 may be performed locally (e.g., using the processor 738) and/or remotely (e.g., at one or more server devices 720 using one or more processors thereon). All such embodiments are envisaged.

Computing device 704 at the DU location may include one or more communication components 750 that enable computing device 704 to communicate with one or more computing devices 702, 712 at one or more DC locations, one or more other computing devices 714 at one or more other DU locations, and one or more server devices 720 over one or more networks 706 via wireless and/or wired communications. For example, the one or more communication components 750 may correspond to network adapter 20 in FIG. 1.

Computing device 704 at the DU location may include or otherwise be associated with at least one memory 752 that may store computer executable program module(s) (e.g., computer executable program module(s) may include, but are not limited to, the automatic closed captioning system 406, the base model 408, the acoustic model 412, language model 414, the customization module(s) 416, the search criteria defining module(s) 418, the matching algorithm module(s) 420, the training algorithm module(s) 422, and associated program module(s)). The automatic closed captioning system 406, the base model 408, the acoustic model 412, the language model 414, the customization module(s) 416, the search criteria defining module(s) 418, the matching algorithm module(s) 420, and the training algorithm module(s) 422 may correspond to program modules 42 in FIG. 1. Computing device 704 at the DU location may also include or otherwise be associated with at least one processor 758 that executes the computer executable program module(s) stored in the memory 752. Server system 704 may further include a system bus 760 that may couple the various components including, but not limited to, communication component(s) 750, memory 752, processor 758, and/or other components.

While the computing device 704 at the DU location is shown in FIG. 7 as including the automatic closed captioning system 406 and the customization module(s) 416, in other embodiments, any number of different types of devices may be associated with or include all or some of the automatic closed captioning system 406 and the customization module(s) 416. For example, one or more server devices 720 may include all or some of the automatic closed captioning system 406 and/or the customization module(s) 416. In other words, data processing associated with the automatic closed captioning system 406 and/or the customization module(s) 416 may be performed locally (e.g., using the processor 758) and/or remotely (e.g., at one or more server devices 720 using one or more processors thereon). All such embodiments are envisaged.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A method of customizing an automatic closed captioning system, the method comprising:
   providing, at a data use (DU) location, an automatic closed captioning system comprising a base model;
   defining, at the DU location, search criteria to request from one or more data collection (DC) locations;
   sending a search request to each of the one or more DC locations, wherein the search request is based on the search criteria;
   receiving, at the DU location, relevant closed caption data from each of the one or more DC locations responsive to the search request;
   processing, at the DU location, the received relevant closed caption data, wherein the processing operation includes computing a confidence score for each of a plurality of data sub-sets of the received relevant closed caption data and selecting one or more of the data sub-sets based on the confidence score of each of the selected one or more data sub-sets;

customizing, at the DU location, the automatic closed captioning system, wherein the customizing operation includes using the selected one or more data sub-sets to train the base model.

2. The method as recited in claim 1, the method further comprising:
collecting, at each of the one or more DC locations, closed caption data;
curating, at each of the one or more DC locations, the collected closed caption data;
selecting, at each of the one or more DC locations, the relevant closed caption data from among the collected and curated closed caption data based on the search request;
sending, from each of the one or more DC locations, the relevant closed caption data to the DU location.

3. The method as recited in claim 2, wherein curating, at each of the one or more DC locations, the collected closed caption data includes tagging the collected closed caption data with a searchable locator identifying at least a portion of the collected closed caption data as either a news closed caption or as a closed caption for an advertisement.

4. The method as recited in claim 2, wherein curating, at each of the one or more DC locations, the collected closed caption data includes tagging the collected closed caption data with a searchable locator identifying at least a portion of the collected closed caption data according to chronological order, wherein the searchable locator includes a day, month, and year of broadcast.

5. The method as recited in claim 2, wherein curating, at each of the one or more DC locations, the collected closed caption data includes tagging the collected closed caption data with a searchable locator identifying at least a portion of the collected closed caption data according to content, wherein the searchable locator is selected from the group consisting of international news, national news, local news, sports, weather, and talk show.

6. The method as recited in claim 2, wherein curating, at each of the one or more DC locations, the collected closed caption data includes tagging the collected closed caption data with a searchable locator identifying at least a portion of the collected closed caption data according to metadata and/or keywords.

7. The method as recited in claim 2, wherein curating, at each of the one or more DC locations, the collected closed caption data includes converting the collected closed caption data to embeddings selected from the group consisting of Term Frequency-Inverse Document Frequency (TF-IDF) embeddings, word embeddings, and sentence embeddings.

8. The method as recited in claim 2, wherein curating, at each of the one or more DC locations, the collected closed caption data includes pairing the collected closed caption data with corresponding audio recordings.

9. The method as recited in claim 1, wherein defining, at the DU location, search criteria to request from one or more DC locations includes defining search criteria to facilitate search for relevant closed caption data with respect to one or more desired targets.

10. The method as recited in claim 1, wherein defining, at the DU location, search criteria to request from one or more DC locations includes defining search criteria to facilitate search for relevant closed caption data with respect to a desired data set.

11. The method as recited in claim 10, further comprising:
decoding, at the DU location, an audio recording corresponding to the desired data set using the base model to produce decoded data to serve as seed data;
wherein defining, at the DU location, search criteria to request from one or more DC locations includes using the decoded data as the search criteria for direct text search.

12. The method as recited in claim 11, further comprising:
building, at the DU location, a language model using the decoded data;
scoring, at the DU location, the text received as the relevant closed caption data from each of the one or more DC locations using the language model.

13. The method as recited in claim 10, further comprising:
decoding, at the DU location, an audio recording corresponding to the desired data set using the base model to produce decoded data to serve as seed data;
converting, at the DU location, the decoded data to embeddings;
wherein defining, at the DU location, search criteria to request from one or more DC locations includes using the embeddings as the search criteria;
scoring, at the DU location, the embeddings received as the relevant closed caption data from each of the one or more DC locations based on similarity scores according to the search criteria.

14. The method as recited in claim 10, further comprising:
decoding, at the DU location, an audio recording corresponding to the desired data set using the base model to produce decoded data to serve as seed data;
wherein customizing, at the DU location, the automatic closed captioning system includes customizing one or more base systems at the DU location using the relevant closed caption data received at the DU location from each of the one or more DC locations that matches the seed data.

15. The method as recited in claim 14, wherein customizing, at the DU location, the automatic closed captioning system includes customizing at least one of a language model, an acoustic model, and a vocabulary of a base automatic speech recognition (ASR) system underling the automatic closed captioning system.

16. The method as recited in claim 14, wherein customizing, at the DU location, the automatic closed captioning system includes customizing at least one of an ad detector system to filter out ads, a speaker diarization system, a speaker change detection system, and a speech activity detection system.

17. A system for customizing an automatic closed captioning system, comprising:
a computing device at a data use (DU) location, wherein the computing device at the DU location comprises one or more processors, one or more computer readable storage devices, and program instructions stored on at least one of the one or more computer readable storage devices for execution by at least one of the one or more processors, the program instructions executable to:
provide an automatic closed captioning system comprising a base model;
define search criteria to request from one or more data collection (DC) locations;
send a search request to each of the one or more DC locations, wherein the search request is based on the search criteria;
receive relevant closed caption data from each of the one or more DC locations responsive to the search request;
process the received relevant closed caption data, wherein the processing operation includes computing a confidence score for each of a plurality of data sub-sets of the received relevant closed caption data and selecting one or more of the data sub-sets based on the confidence score of each of the selected one or more data sub-sets;

customize the automatic closed captioning system, wherein the customizing operation includes using the selected one or more data sub-sets to train the base model.

18. The system as recited in claim 17, further comprising:
a computing device at each of the one or more DC locations, wherein the computing device at each of the one or more DC locations comprises one or more processors, one or more computer readable storage devices, and program instructions stored on at least one of the one or more computer readable storage devices for execution by at least one of the one or more processors, the program instructions executable to:
collect closed caption data;
curate the collected closed caption data;
select the relevant closed caption data from among the collected and curated closed caption data based on the search request;
send the relevant closed caption data to the DU location.

19. A computer program product for customizing an automatic closed captioning system, the computer program product comprising a computer readable storage medium having program code embodied therewith, the program code executable by one or more processors, to perform a method comprising:
providing, at a data use (DU) location, an automatic closed captioning system comprising a base model;
defining, at the DU location, search criteria to request from one or more data collection (DC) locations;
sending a search request to each of the one or more DC locations, wherein the search request is based on the search criteria;
receiving, at the DU location, relevant closed caption data from each of the one or more DC locations responsive to the search request;
processing, at the DU location, the received relevant closed caption data, wherein the processing operation includes computing a confidence score for each of a plurality of data sub-sets of the received relevant closed caption data and selecting one or more of the data sub-sets based on the confidence score of each of the selected one or more data sub-sets;
customizing, at the DU location, the automatic closed captioning system, wherein the customizing operation includes using the selected one or more data sub-sets to train the base model.

20. The computer program product as recited in claim 19, wherein the method further comprises:
collecting, at each of the one or more DC locations, closed caption data;
curating, at each of the one or more DC locations, the collected closed caption data;
selecting, at each of the one or more DC locations, the relevant closed caption data from among the collected and curated closed caption data based on the search request;
sending, from each of the one or more DC locations, the relevant closed caption data to the DU location.

* * * * *